Aug. 14, 1962    R. W. WARFIELD ETAL    3,049,410
NEW CURING TECHNIQUES FOR RESINS
Filed Aug. 20, 1959    9 Sheets-Sheet 1

ISOTHERMAL POLYMERIZATION OF
POLYURETHANE PROPELLANT

INVENTORS
R.W. WARFIELD
M. C. PETREE

BY

ATTORNEYS

ISOTHERMAL POLYMERIZTION OF DIALLYL PHTHALATE
WITH 1.96% BENZOYL PEROXIDE

ISOTHERMAL POLYMERIZATION OF POLYURETHANE POLYMER

FIG.13.
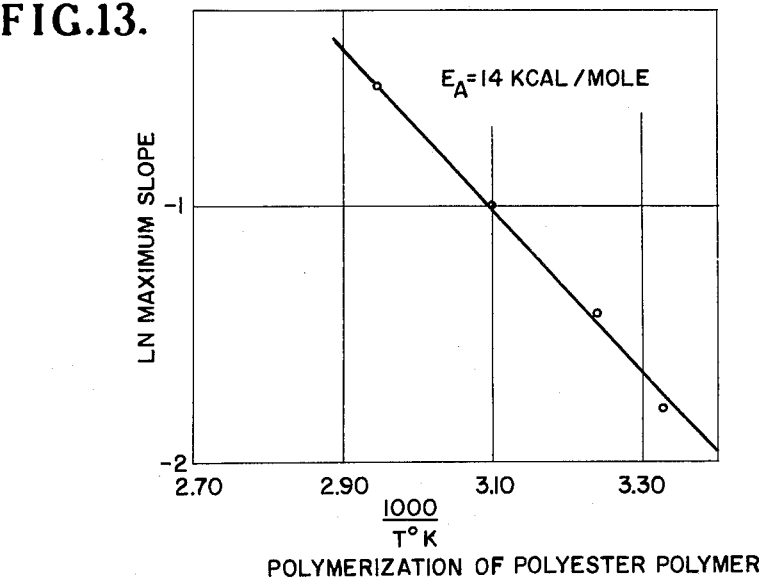
POLYMERIZATION OF POLYESTER POLYMER
FIG.5.
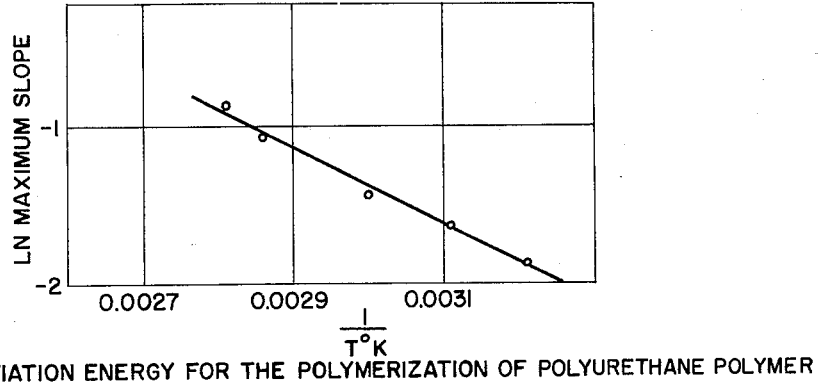
ACTIVIATION ENERGY FOR THE POLYMERIZATION OF POLYURETHANE POLYMER
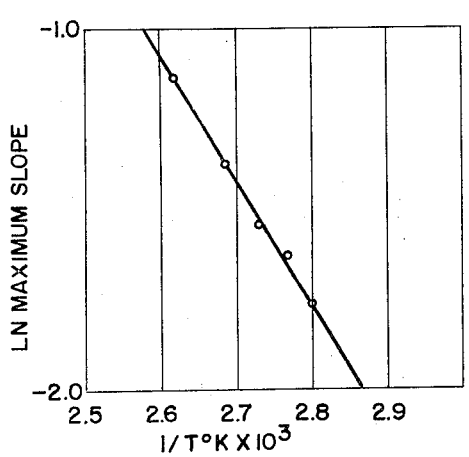
ACTIVATION ENERGY FOR THE
POLYMERIZATION OF DIALLYL
PHTHALATE
FIG.7.

ISOTHERMAL POLYMERIZATION OF A POLYAMIDE-EPOXIDE COPOLYMER

ISOTHERMAL POLYMERIZATION OF EPON 828 WITH 12.6% OF m-PHENYLENE DIAMINE

ISOTHERMAL POLYMERIZTION OF EPON 828 UNTIL 5.7% OF DIETHYLAMINOPROPYL AMINE

ARRHENIUS PLOTS FOR THE POLYMERIZATION OF EPOXIDE POLYMERS

ISOTHERMAL POLYMERIZATION OF A POLYESTER RESIN

United States Patent Office 3,049,410
Patented Aug. 14, 1962

3,049,410
NEW CURING TECHNIQUES FOR RESINS
Robert W. Warfield, 1904 Fox St., Hyattsville, Md., and Marcella C. Petree, 13490 Columbia Road, Silver Spring, Md.
Filed Aug. 20, 1959, Ser. No. 835,148
2 Claims. (Cl. 23—230)
(Granted under Title 35, U.S. Code (1952), sec. 266)

The invention described herein may be manufactured and used by or for the Government of the United States of America for governmental purposes without the payment of any royalties thereon or therefor.

This invention relates to a method for determining optimum temperatures for the bulk curing of resins, polymers, propellant binders and filled solid propellants from the standpoint of obtaining a product having good tensile strength in the shortest time; more specifically the invention relates to such a method which involves measuring changes in electrical resistivity of samples during polymerization.

To have a product possessing good tensile strength, it is necessary to at least substantially polymerize it, a complete cure being neither necessary nor desirable for many applications.

Generally, resins, polymers, propellant binders and filled solid propellants cure faster at higher temperatures regardless of the reaction mechanism involved, but in many applications resins, polymers, propellant binders and filled solid propellants cannot be cured at high temperatures because of the sensitive nature of the final product or because of some other adverse effect such a high curing temperature would have upon the final product, as where a heat sensitive element is encapsulated in a resin.

In the past, such polymerizations have been conducted at low temperatures to avoid the adverse effects of heat, with consequent long curing times.

It is therefore an object of this invention to provide a method for determining minimum curing time for resins etc. where a maximum curing temperature limit exists.

Another object is to provide a method of determining the effect of temperature upon the rate of cure due to a change in mechanism of reaction.

Still another object of the invention is to provide a method for polymerizing a resin to obtain desired physical properties in the product with minimum curing times.

Other objects and many of the attendant advantages of this invention will be readily appreciated as the same becomes better understood by reference to the following detailed description when considered in connection with the accompanying drawings in which:

FIG. 5 is a graph prepared by plotting the natural logarithms of the maximum slopes of the curves shown in FIG. 4 as functions of the reciprocals of the absolute temperatures at which the curves were obtained;

FIG. 7 is a graph prepared by plotting the natural logarithms of the maximum slopes of the curves shown in FIG. 6 as functions of the reciprocals of the absolute temperatures at which the curves were obtained;

FIG. 13 is a graph prepared from FIG. 12, plotting natural logarithms of the maximum slopes of the curves in FIG. 12 versus the reciprocal of the absolute temperatures.

Figure 1:
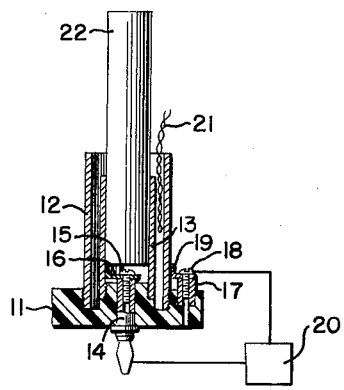
FIG. 1 is a cross-sectional elevational view of the apparatus used to measure the resistivity of samples undergoing polymerization.

Referring now to the drawings, there is shown in FIG. 1 an insulating base plate 11 having an annular recess provided with threads and having a centrally located cylindrical portion raised from the level of the annular recess which is provided with threads.

Nickel plated copper tube 12 is threaded externally at one end and is attached to plate 11 by engagement of its threads with the internal threads of the annular recess. Nickel plated copper tube 13, having a smaller diameter than tube 12 is threaded internally and is attached to plate 11 by engagement of its threads with the threads of the centrally located raised portion of plate 11. Tube 13 is further positioned inside the larger tube 12 so that a uniform space exists between them.

Plate 11 is further provided with two normal apertures, one positioned substantially centrally and the other positioned near the edge of the plate.

Electric contact 14 is positioned in the central aperture and one end protrudes from the bottom of the plate. The opposite end of contact 14 is adapted to receive screw 15 which first passes through an aperture in member 16 which is connected to tube 13, so that when the screw is tightened, good electrical connection is made between contact 14 and tube 13.

Plug 17 is positioned in the aperture near the edge and is adapted to receive screw 18 which first passes through an aperture in member 19 which is connected to tube 12, so that when screw 18 is tightened, good electrical connection is made between screw 18 and tube 12. Ohmmeter 20 is connected across the two electrical contacts to measure resistance.

Thermocouple 21 is positioned between tubes 12 and 13 to permit a continuous measurement of temperature when the space between the tubes is filled with liquid resin with the aid of glass tube 22 which is positioned within tube 13, extending considerably above it, so as to prevent the liquid resin from spilling over inside tube 13. Essentially, the apparatus is a cylindrical capacitor, the resin under investigation being the dielectric.

The objects of this invention are accomplished by using the apparatus of FIG. 1 to conduct a series of measurements, thereby to determine the resistivity of samples continuously as polymerization proceeds, by plotting the resistivity determined as functions of time at which the resistivity was determined, and by preparing another plot wherein the natural logarithms of the maximum slopes of the resistivity-time curves are plotted as functions of the reciprocal of the absolute temperatures at which the curves were obtained.

The resistivity of a dielectric material is temperature dependent, and to eliminate the effect of temperature, a series of isothermal polymerizations are conducted so that changes in the resistivity measured will be a measure of the extent of polymerization.

At the start, resin, etc. and catalyst, if any, are mixed and thoroughly blended. Then the liquid mixture is poured into the apparatus which is then put into a small laboratory oven where the thinness of the sample permits isothermal conditions to be maintained to within 1° C. throughout the polymerization, the temperature being continuously measured by the thermocouple. Time is measured from the instant the resin, etc. and catalyst, if any, are mixed and resistivity is determined continuously.

Resistivities increase as polymerization proceeds and the resin, etc. is transformed from a liquid to a gel and finally to a solid.

By plotting the resistivities on logarithmic scales and the times on a linear scale, a series of curves are obtained, a portion of each such curve being initially a straight line, or nearly so, the slopes of such linear portions becoming greater as temperatures increase. The time rate of change of the logarithm of the resistivity is an index of the rate of polymerization.

After polymerization has proceeded for some time, the curves begin to level off and when the logarithm of the resistivity ceases to change with respect to time, the resin, etc. is deemed to be cured. Such a constant logarithm does not necessarily indicate a complete polymerization, but simply means that a three dimensional polymer network has formed and becomes sufficiently viscous to render further polymerization inordinately time consuming.

Applicants have found that a second graph prepared from the resistivity-time curves plotted in the first graph in which the natural logarithms of the maximum slopes of the curves are plotted against the reciprocals of the absolute temperatures at which the curves were obtained is linear and that its slope is proportional to the overall activation energy for the polymerization process; the proportionality being derived from the rate equation of Arrhenius.

The significance of the activation energy lies in the fact that different reaction mechanisms if any which predominate at different temperatures can be detected by abrupt changes if any in the slope of the Arrhenius or activation energy curve. The temperatures indicated by such changes in slope represent minimums at which to cure samples, because the cure is much faster and complete cure is much more readily obtained at temperatures above the point of change with correspondingly better physical properties. The maximum curing temperature of course is governed by other considerations.

Figure 3:
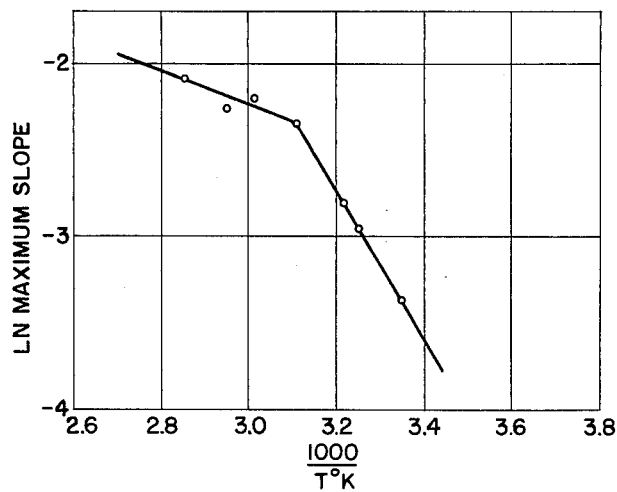
FIG. 3 is a graph prepared by plotting the natural logarithms of the maximum slopes of the curves shown in FIG. 2 as functions of the reciprocals of the absolute temperatures at which the curves were obtained.

In FIG. 3 the final product obtained by polymerizing at above 50° C. will be better than the product obtained by polymerizing below 50° C. because the reaction having the lower activation energy will proceed to a greater extent because of greater tendency of functional groups to react resulting in a more highly crosslinked resin or polymer.

Following are some specific examples of aplicants' invention:

*Example 1*

A polyurethane propellant was prepared by mixing an isocyanate and castor oil in a 60%–40% ratio by weight to form a binder. To this mixture was added 65% ammonium perchlorate and 13% comminuted aluminum which were thoroughly mixed and blended. Then samples of the composition were placed in apparatus such as that shown in FIG. 1 and each sample polymerized at a different temperature; measurements of resistivity were made at intervals.

Figure 2:
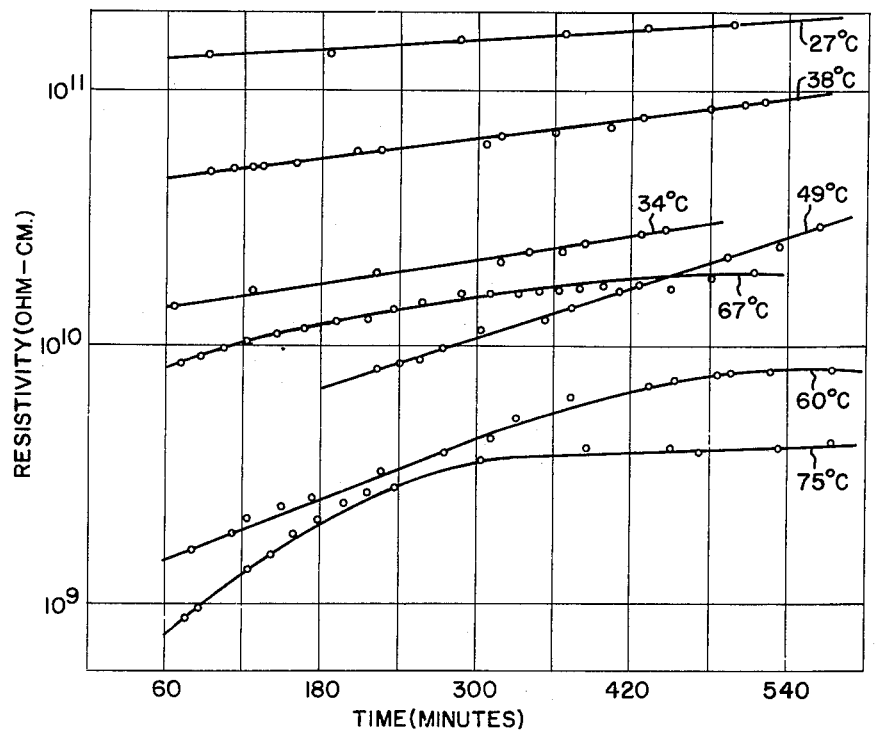
FIG. 2 is a graph showing electrical resistivities plotted as functions of time for a series of isothermal polymerizations of constant composition samples of a polyurethane propellant.

FIG. 2 is a graph in which resistivity is plotted as a function of time for each isothermal polymerization, the resistivity being plotted on a logarithmic scale. The samples polymerized at 38° and at 67° C. were from a different batch than the others which affects the value of the logarithm of resistivity but not the slope of the curve.

The time to complete cure is easily determined in the curves at 60°, 67° and 75° C. and is the point at which the slope becomes zero. The time rate of change of the logarithm of the resistivity is taken as the rate of polymerization.

FIG. 3 is a graph prepared by plotting the natural logarithms of the maximum slopes of the curves from FIG. 2 as functions of the absolute temperatures at which the slopes were obtained; the maximum slope always occurs in the initial straight portion. The slope of the curve in FIG. 3 is proportional to the activation energy for the polymerization process; this relationship is derived from the rate equation of Arrhenius, $$k = Ae - \frac{E}{RT}$$

where $k$=the rate of reaction, $A$=the frequency factor, $E$=the activation energy, $R$=the universal gas constant, and $T$=the absolute temperature. Then $$\log k = -\frac{E}{2.303R} \cdot \frac{1}{T} + \log A$$

Thus $E$=(slope of curve) (2.303R).

It will be noted that a sharp break occurs in the curve corresponding to a temperature of about 50° C. This signifies that one reaction mechanism predominates at temperatures below 50° C. and another, faster mechanism predominates at temperatures above 50° C. Thus the propellant should be cured above 50° C. because of the faster mechanism, the upper curing temperature limit being governed by the sensitive nature of the product which likely to deflagrate if temperatures become too high.

Samples of this propellant have been cured in excess of 50° C. to a constant value of resistivity and exhibit superior properties to samples cured laboriously at 38° C. The existence of the faster reaction mechanism at temperatures above 50° C. is not obvious from the graph of FIG. 2; it is only obvious that curing rates increase generally with temperature.

*Example 2*

Figure 4:
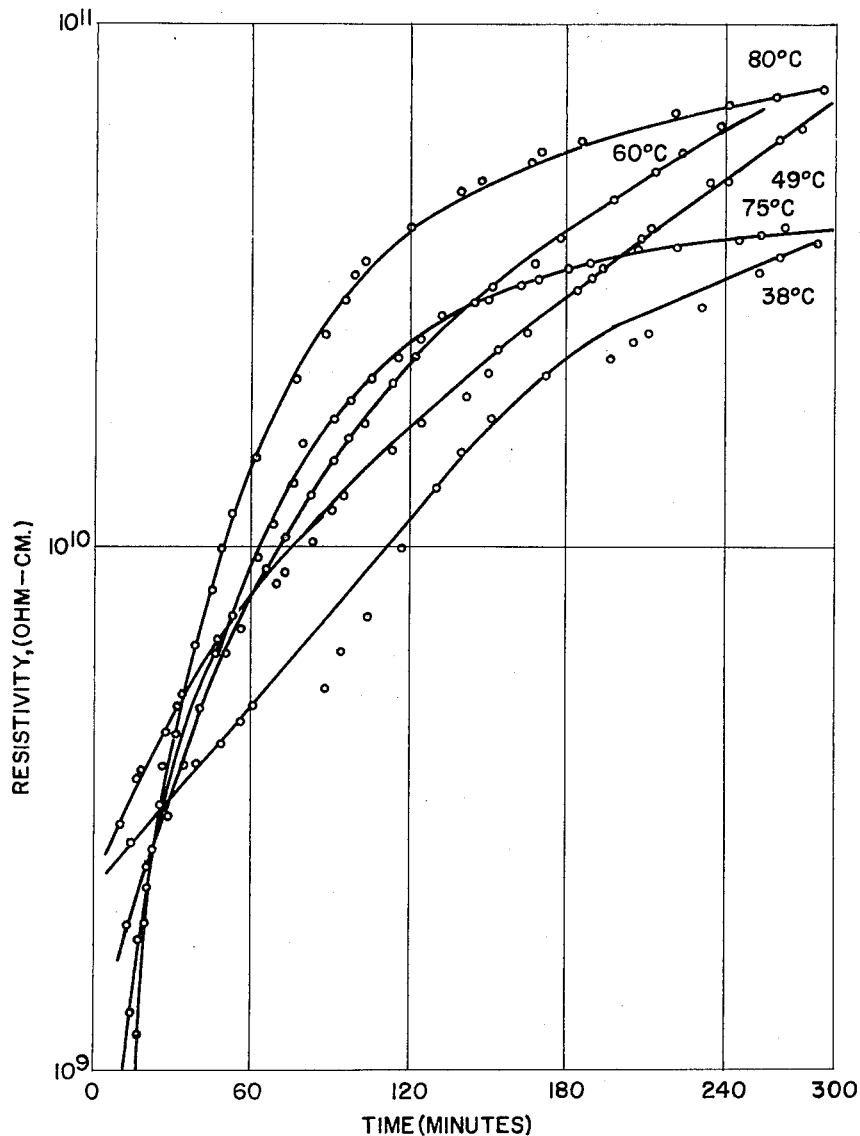
FIG. 4 is a graph showing electrical resistivities plotted as functions of time for a series of isothermal polymerizations of samples of the polyurethane resin used as the binder in the propellant with which the graph of FIG. 2 is concerned.

The binder used in Example 1, 60% of an isocyanate and 40% of castor oil by weight, were initially blended and placed in the apparatus of FIG. 1 and the polymerization process monitored as with the composition of Example 1. FIG. 4 shows the semi-logarithmic plot of resistivity versus time, and illustrates the rates of polymerization and times required at the various temperatures.

FIG. 5 shows the graph prepared from the curves of FIG. 4 in which the natural logarithms of the maximum slopes of the curves are plotted as functions of reciprocals of the absolute temperatures at which the curves were obtained. It will be noted that the slope of the curve of FIG. 5 is constant throughout with no sudden changes. Thus one reaction mechanism only occurs over the temperature range observed.

The curve obtained in FIG. 5 is surprising in that no sudden change in slope occurred as with the composition of Example 1, since the difference between the two compositions was in the loading of Example 1 with inorganic materials. Comparison of FIGS. 3 and 5 seems to indicate that ammonium perchlorate catalyzes the polymerization at temperatures above 50° C.

*Example 3*

Figure 6:
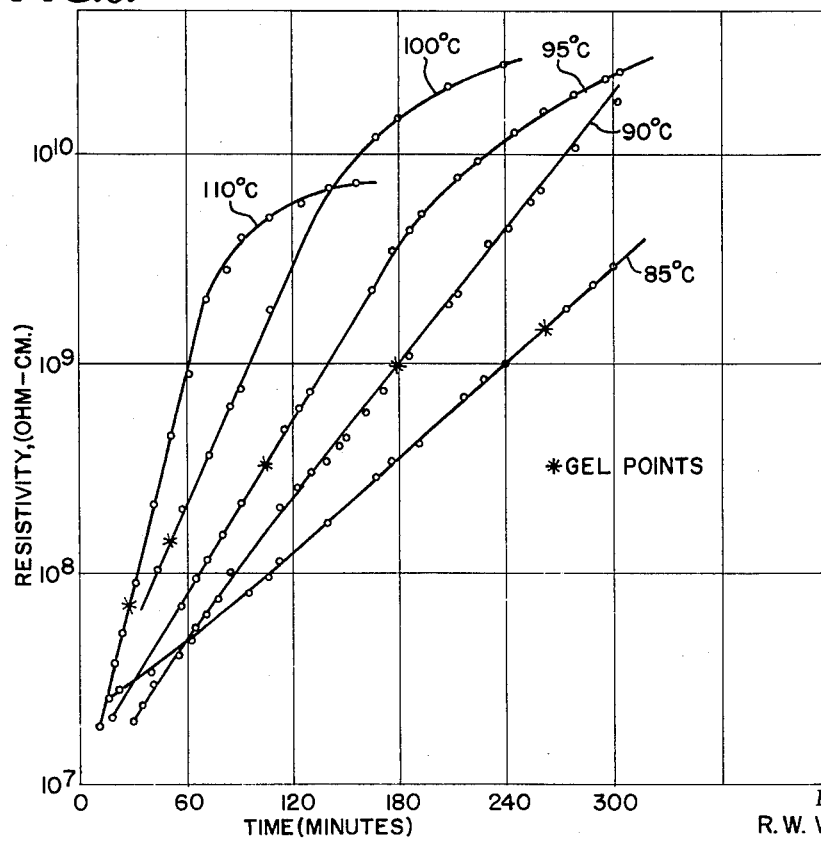
FIG. 6 is a graph showing electrical resistivities plotted as functions of time for a series of isothermal polymerizations of samples of diallyl phthalate catalyzed with 1.96% benzoyl peroxide by weight.

Diallyl phthalate monomer was mixed thoroughly with 1.96% benzoyl peroxide catalyst and different samples polymerized at different temperatures as in the preceding examples. FIG. 6 is a semi-logarithmic plot of resistivity versus time and illustrates the rates of polymerization and times required at the various temperatures. It is interesting to note that the rate of polymerization does not change at the gel point which is indicated by the asterisk marks on FIG. 6.

FIG. 7 is a graph of the logarithms of the maximum slopes of the curves of FIG. 6 versus the reciprocals of the absolute temperatures at which the curves were obtained. The curve is a straight line which indicates that only one reaction mechanism is present over the temperature range covered.

Samples of this composition have been cured to a constant value of the logarithm of resistivity and the degree of polymerization corresponds to 60–70% as determined by infra-red absorption.

Values for the activation energy for the polymerization process are in good agreement with values determined by other more laborious techniques.

*Example 4*

Figure 8:
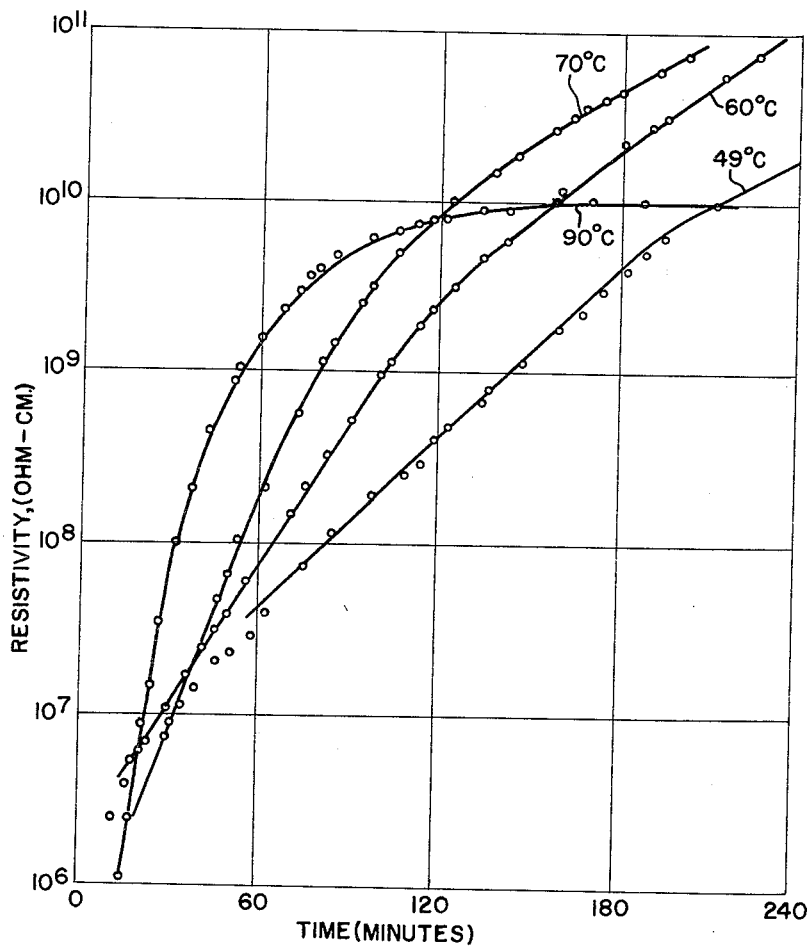
FIGS. 8, 9 and 10 are graphs showing electrical resistivities plotted as functions of time for a series of isothermal polymerizations of samples of epoxide resins catalyzed with various substances, the composition of FIG. 8 being a copolymer.
Figure 9:
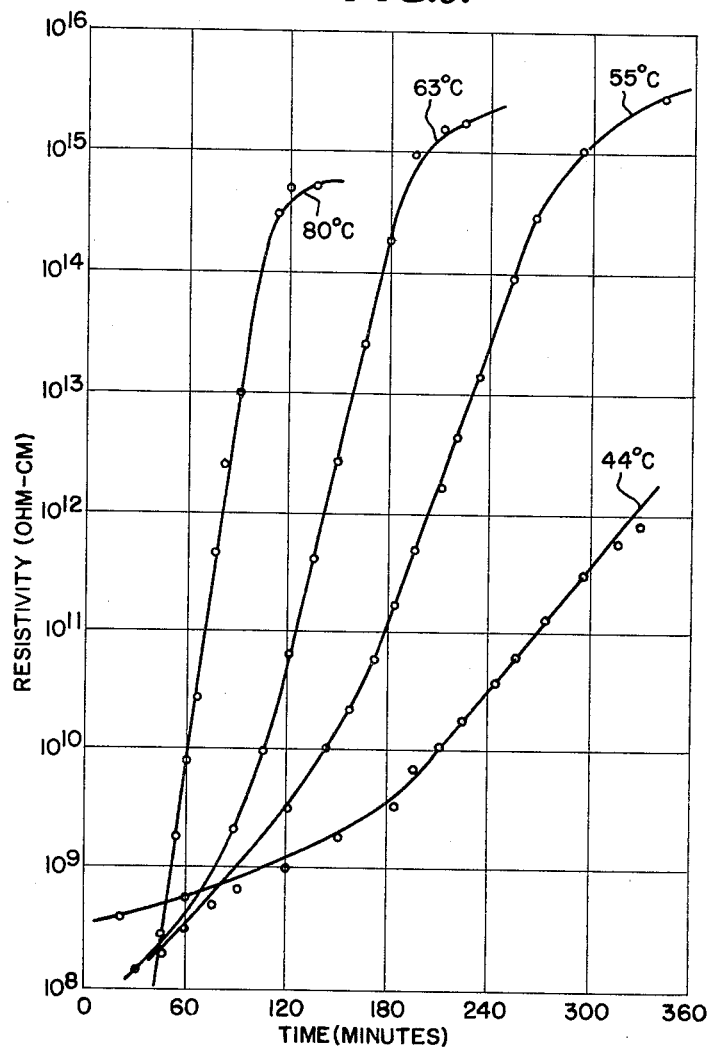
Figure 10:
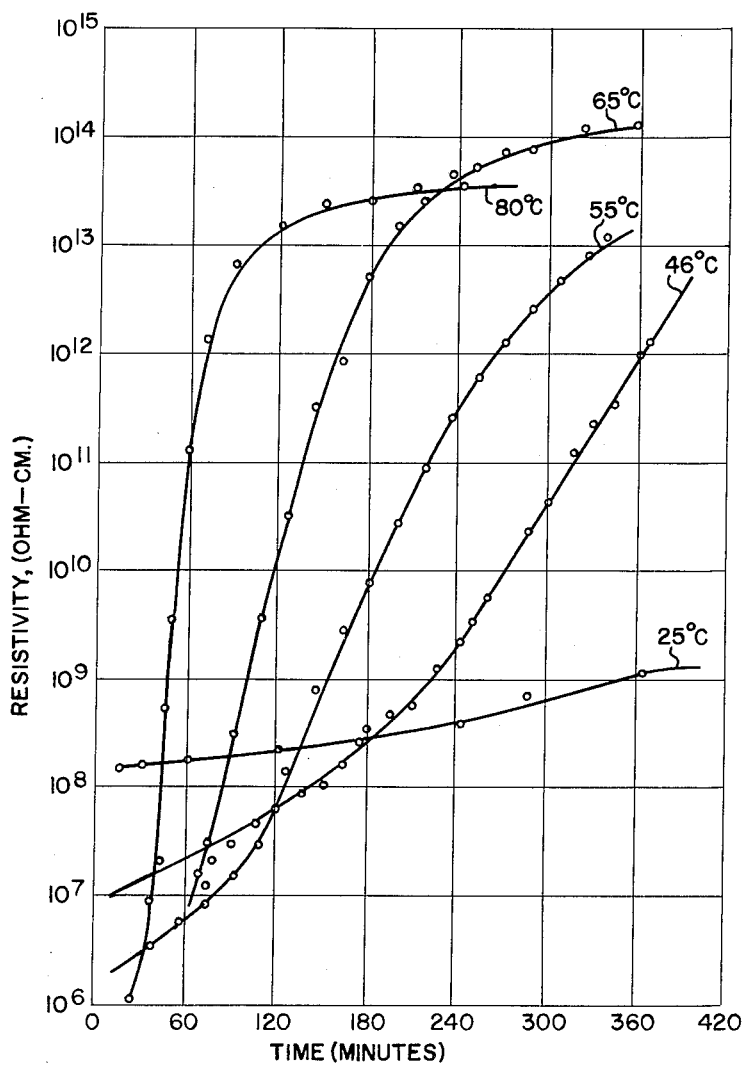

FIGS. 9 and 10 show semilogarithmic plots of resistivity versus time for an epoxide resin known commercially as Epon 828 with various catalysts. Epon 828 is the reaction product of epichlorohydrin and bis (4-hydroxyphenyl)-dimethyl methane. The composition with which FIG. 8 is concerned is a copolymer of Epon 828 and a polyamide which is a reaction product of 9,12-linoleic acid dimer and a polyamine.

Figure 11:
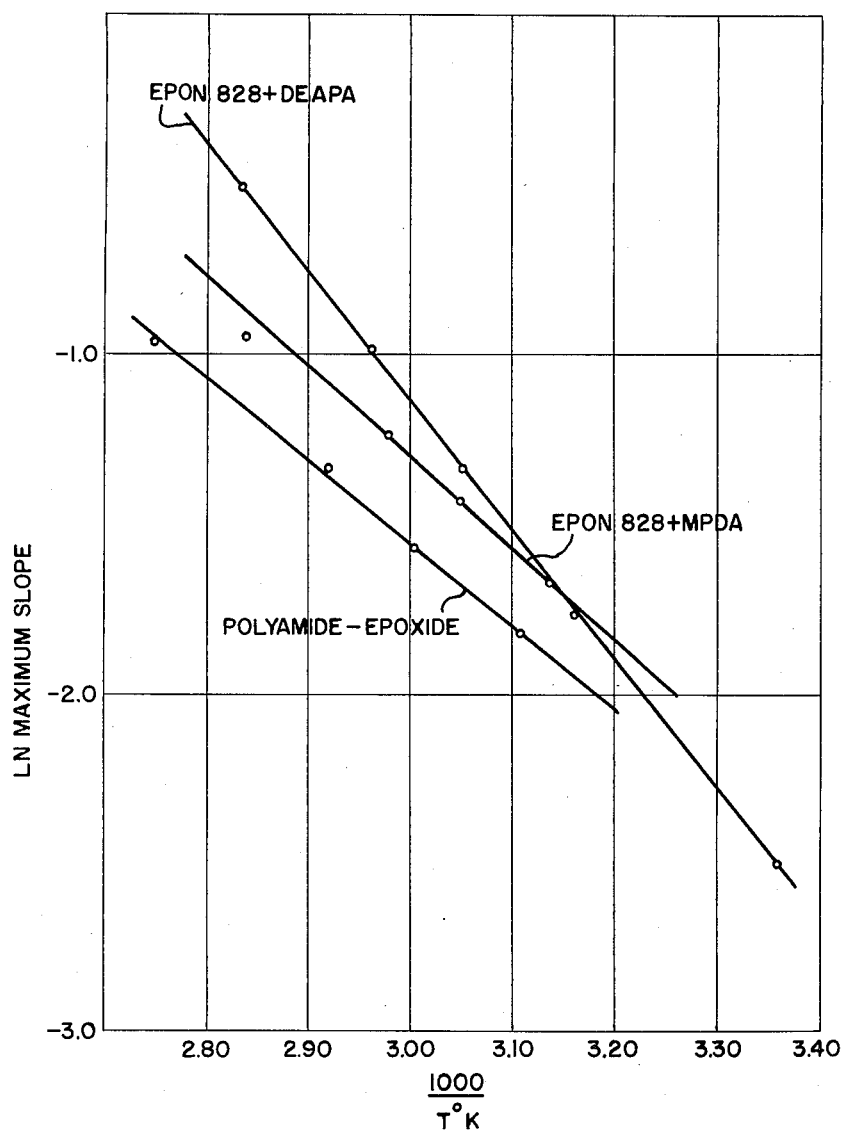
FIG. 11 is a graph prepared by plotting the natural logarithms of the maximum slopes of the curves shown in FIGS. 8, 9 and 10 as functions of the reciprocals of the absolute temperature at which the curves were obtained.

FIG. 11 is a graph prepared from the curves of FIGS. 8, 9 and 10 by plotting the natural logarithms of the maximum slopes of resistivity-time curves versus temperatures as in the preceding examples. The slopes are constant over the temperature ranges observed, and only one reaction mechanism occurs for each case.

Values for the activation energy are in good agreement with published values obtained by more elaborate methods.

*Example 5*

Figure 12:
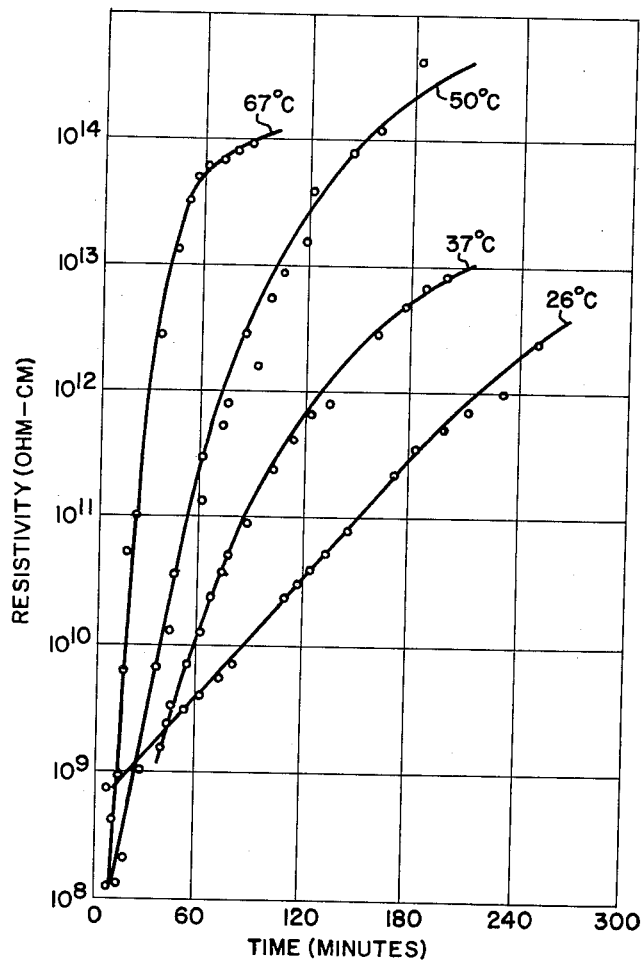
FIG. 12 is a graph showing electrical resistivities plotted as functions of time for a series of isothermal polymerizations of samples of a polyester resin.

FIG. 12 shows a semilogarithmic plot of resistivity versus time for a 70% unsaturated polyester resin plus 30% styrene by weight, catalyzed with 1% methyl ethyl ketone peroxide and with 2% of cobalt naphthenate as an accelerator.

FIG. 13 shows the activation energy plot prepared from the plot of FIG. 12 by previously described methods. The slope of the curve is constant and does not indicate that more than one reaction mechanism occurs over the temperature range observed.

The resistivity of a sample may be determined in several ways. The resistance of the sample may be determined directly with an ohmmeter connected across the sample, or the current thru the sample may be measured along with the voltage drop across it, and resistance calculated from Ohm's law. The resistance of the sample multiplied by the ratio $A/L$ gives the resistivity, where A is the surface area of the sample perpendicular to the potential gradient and L is the current path length of the sample.

Alternatively, a cell may be made where both A is one square centimeter and L is one centimeter, in which case the resistivity and the resistance are numerically equal.

A cylindrical cell is not necessary as any cell comprising a capacitor with the resinous dielectric between the plates would be satisfactory. The dielectric should be thin however, to easily dissipate the heat of polymerization and thus maintain isothermal conditions.

Low voltages should be used in the measurement of resistivity to avoid any breakdown of the resinous dielectric.

This method gives particularly accurate determinations because the contact resistance between the capacitor plates and the dielectric is so low that it is unimportant. The resin is polymerized directly to the capacitor.

It has been shown that the activation energy for a polymerization process can be determined from resistivity measurements and that changes in the activation energy with changing temperatures denote changes in mechanisms of reaction which affects the rate of polymerization.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. The process of indicating the optimum range of curing temperature of resins, polymers, propellant binders and filled solid propellants necessary to obtain a product having good tensile strength in the shortest time by heat treating which includes the steps of placing a series of liquid like samples of the substance to be treated in a series of receptacles comprising a pair of concentrically disposed mutually separated hollow cylindrical capacitor elements having means connected thereto for indicating the resistivity of a sample disposed therein as the sample is heated isothermally to polymerization, and heat responsive means for indicating the heated temperature of the sample, isothermally polymerizing the liquid sample, repeating the last-named step upon additional like samples of the substance to be treated, the curing temperature of each sample being different from the curing temperatures of the remaining samples, plotting the logarithm of resistivity of each of the samples at intervals of time, plotting the logarithm of the maximum rate of change of the logarithm of resistivity of each of the samples against the reciprocal of the absolute temperatures respectively applied thereto, and drawing a curve having an abrupt change of slope connecting the plotted points of the last named step to indicate the optimum range of temperature at which polymerization of the sample should be conducted.

2. The process of indicating the optimum time interval required at a fixed temperature to completely polymerize propellant binders and solid propellants which includes the steps of placing a series of liquid like samples of the propellant binders and solid propellants in a series of receptacles respectively, each receptacle having means connected thereto for indicating the resistivity of the sample disposed therein as the sample is heated to polymerization and thermocouple means for indicating the heated temperature of the sample, placing each receptacle in a laboratory oven and applying a predetermined temperature thereto for a time sufficient to isothermally polymerize the liquid sample, each of said samples having a different temperature applied thereto, plotting the logarithm of resistivity of each of the samples at intervals of time, and drawing a curve for each sample through the plotted points at least until the maximum resistivity is attained, whereby the optimum time of polymerization of each of the samples corresponds to the time when the maximum value of the logarithm of the resistivity thereof is first attained.

References Cited in the file of this patent

Chem. & Eng. News, pp. 62–63, Oct. 7, 1957.
Chem. & Eng. News, pp. 79–80, Nov. 11, 1957.
Warren: "Rocket Propellants," pp. 56–68 (1958), Reinhold Publishing Co.